United States Patent Office 3,446,367
Patented May 27, 1969

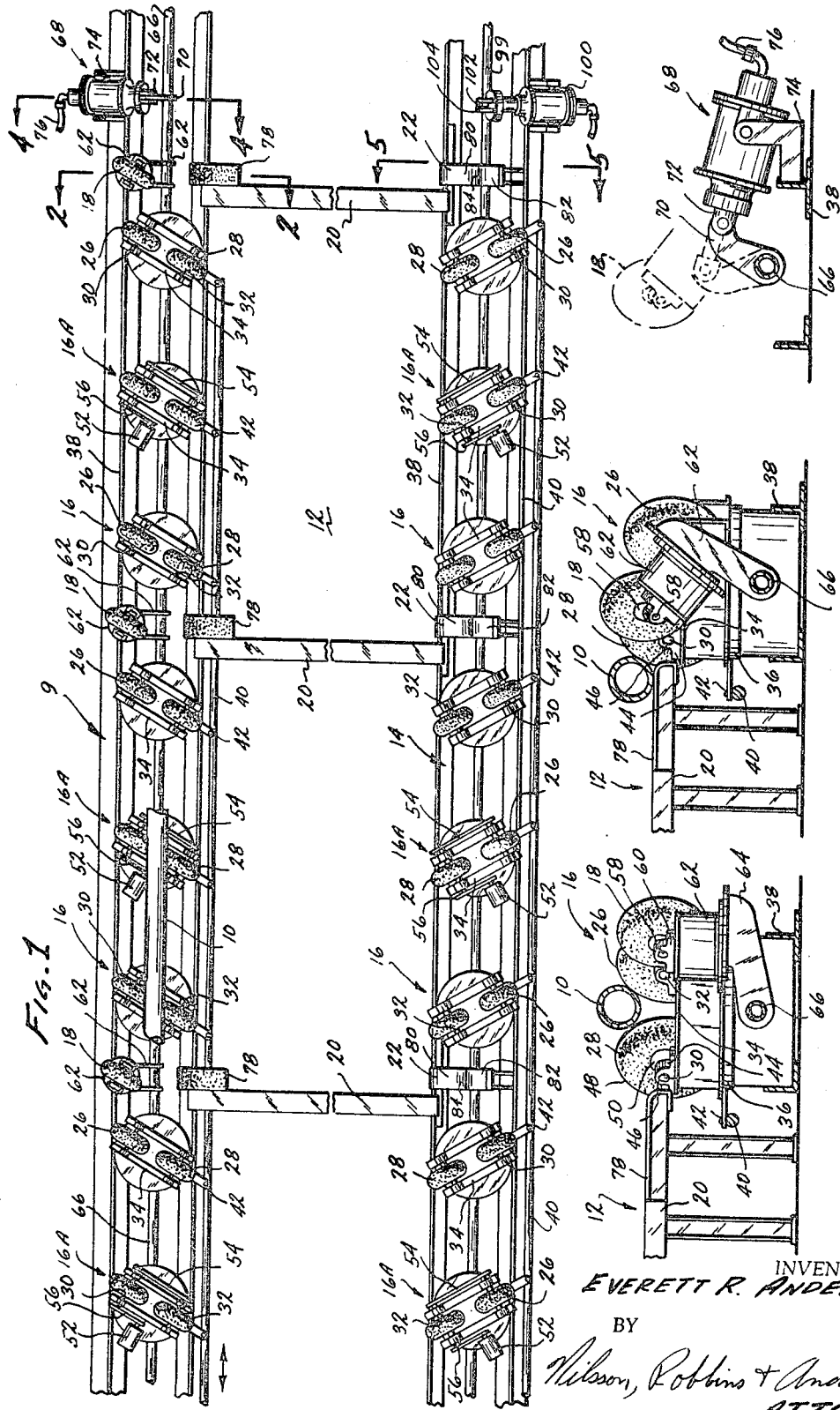

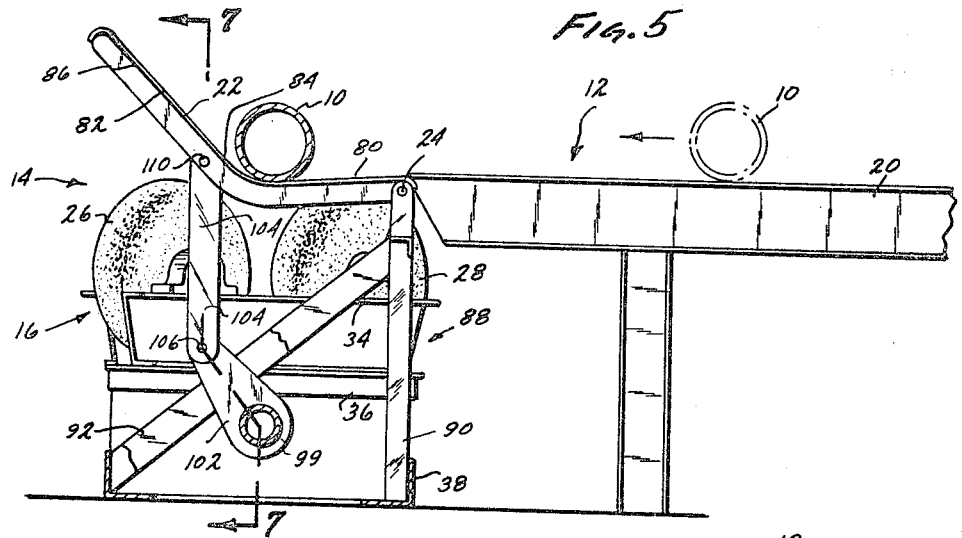
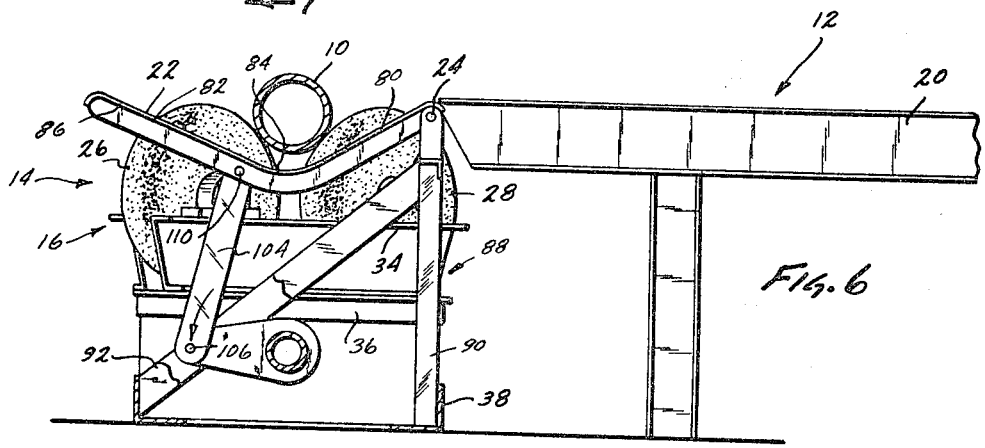
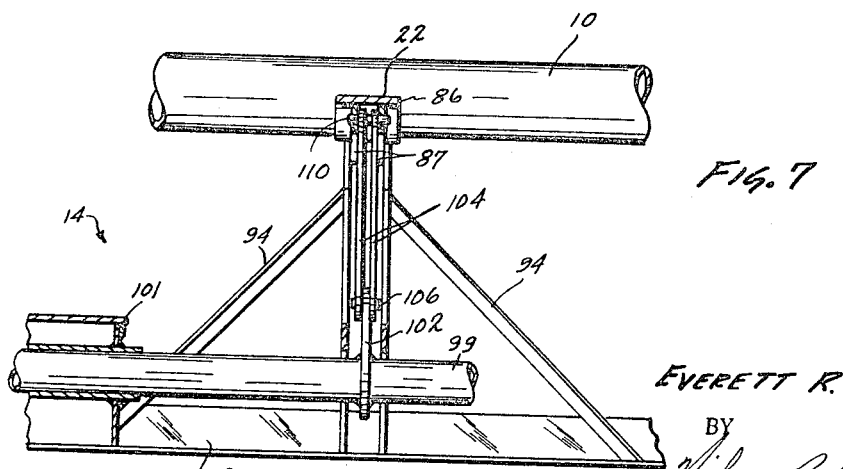

3,446,367
CONVEYOR FOR PIPE SECTIONS
Everett R. Anderson, Pico Rivera, Calif., assignor to Pacific Pipeline Construction Company, a corporation of California
Filed May 23, 1967, Ser. No. 640,667
Int. Cl. B65h *51/26;* B65g *47/02, 47/34*
U.S. Cl. 214—1                                     3 Claims

ABSTRACT OF THE DISCLOSURE

A pipe conveyor including transfer structure for moving pipes between a roll rack and an axial-motion apparatus without damage. While being moved axially, pipes are carried between cooperating pairs of canted wheels which revolve a pipe as it moves along an axial path. To place a pipe on the wheels, or remove it therefrom, spaced-apart pivotally-mounted transfer units cooperatively carry the pipe along with the wheel pairs, to lower or raise the pipe to the desired position. A pipe is lowered onto the wheel pairs in accurately-positioned relationship and is gently removed therefrom by a plurality of spaced-apart cushioned rollers or wheels.

Background of the invention

Pipe conveyors that revolve or turn the pipes as they are moved axially are widely employed in processes to wrap, coat or otherwise treat sections of pipe. For example, a pipe is sometimes coated with tar or other substance, then wrapped with paper to provide a protective covering. Among the various pipe processing operations, a large number can be easily performed on a section of pipe as it traverses a helical path, i.e. the pipe is revolved as it is axially translated. During such movement the pipe not only exposes its total surface for treatment but also it can draw and receive a covering wrapper from a roll of sheet medium, e.g. paper.

Various structures have been proposed in the past for conveying sections of pipe along a linear axial path while concurrently turning or revolving the pipe. However, a serious problem which arises in the use of these conveyors involves getting the lengths of pipe on and off the helical motion conveyor or transport. Specifically, helical transports are normally employed to move sections of pipe through a treating station in which the pipe may be coated or finished. Thereafter, to preverse the coating or finish on the pipe, it must normally be handled gently, at least during a curing period. However, as the pipe is moving both axially and rotatively, its transfer from the transport onto a loading platform or other static structure without damage, has in the past presented a significant problem. In general, the prior practice has been either to stop the conveyor and remove the pipe manually, or anticipate a certain amount of rough treatment for the pipe, resulting in a significant number of rejections. Of course, a high rejection rate considerably increases unit cost; however, repeated stop-start periods are very time-consuming and therefore are also costly in a processing operation. As a result, a considerable need exists for a pipe conveyor system incorporating structure to remove the pipe from that portion of the conveyor on which they are driven in a helical manner.

In addition to removing sections of pipe from the helical drive transport, somewhat of a problem is also encountered in placing the pipes on the transport. Specifically, it is desirable to place the pipe centrally between the pairs of co-acting wheels that will impart motion to the pipes. Such an operation is difficult if performed manually. Therefore, a need also exists for a loading mechanism incorporated with the helical-drive pipe transport apparatus.

Summary of the invention

The pipe conveyor hereof incorporates a helical-motion transport comprising a plurality of wheels which co-act in pairs to carry a pipe along a linear path and which pairs are canted in relation to the transport path. Certain of the wheels are rotatively driven and directly engage the section of pipe to move it through the desired helical pattern (rotatively and axially). This system also incorporates apparatus in the form of spaced-apart fingers extending between certain pairs of wheels to receive a pipe in an aligned position and lower the pipe onto the axial path defined by the wheel pairs, so as to simply, easily and effectively load pipe onto the helical-motion transport. Furthermore, the system includes structure for removing pipes from the transport, including spaced-apart wheels movably mounted to pass from a position below and at one side of the linear path to a position above and at the other side of the linear path. The structure allows effective movement of pipes from the helical-motion transport without the usual rough treatment that might otherwise damage the coating or finish of a pipe.

Brief description of the drawings

The drawings disclose an illustrative embodiment of the present invention to indicate the various objects and advantages hereof set forth as follows:

FIGURE 1 is a plan view of a conveyor apparatus constructed in accordance with the present invention;

FIGURE 2 is a sectional view taken along line 2—2 of FIGURE 1;

FIGURE 3 is a view similar to FIGURE 2 showing certain operating elements in a different position;

FIGURE 4 is a sectional view taken along lines 4—4 of FIGURE 1;

FIGURE 5 is a sectional view taken along lines 5—5 of FIGURE 1;

FIGURE 6 is a view similar to FIGURE 5 showing certain operating components in a different position; and FIGURE 7 is a sectional view taken along lines 7—7 of FIGURE 5.

Description of the preferred embodiment

The disclosed system serves to illustrate the developments hereof. Referring initially to FIGURE 1, there is shown a fragment of pipe 10 being driven along a linear path (left to right axial to the pipe) on a transport 9, and simultaneously revolved so that the movement of the pipe is a combination of rotation and translation, i.e. a helical pattern. In the operation of the conveyor hereof, upon reaching the end of the transport 9, a pipe is removed therefrom to a roll rack 12 upon which it rolls downwardly and is then loaded upon a transport 14. The transports 9 and 14 are generally similar; however, the transport 9 moves pipes 10 along a linear path from left to right while the transport 14 moves the same pipes along the linear path from right to left. Of course, these transports along with the rack 12 may be variously incorporated in a conveyor system as in cooperation with treatment stations. Thus, the disclosed system merely illustrates one pattern of pipe movement, which is not particularly significant.

As the various elements of the transports 9 and 14 are generally similar, only the transport 9 will be described in detail. In this regard, the pipe 10 is carried by cooperating pairs 16 of canted wheels. Certain of the wheel pairs 16 are rotatively driven while others are idlers serving to support the pipe as it moves. Considering the motion of the pipe 10, it results from the angular offset between the axis of the pipe and the parallel rotative axis of the wheels. That is, the wheels in each pair 16 revolve about two parallel axes of rotation which are similarly angularly offset with respect to the cylindrical axis of the pipe 10 as shown. As a result, of the offset relationship, the pipe 10 is revolved as it is linearly translated, as generally well known in the prior art.

In considering the motion of the pipe 10 along the transport 9, the problem of gently removing the pipe from the transport without scarring the finish is apparent. That is, the transition from a pattern of helical motion to a still position or rolling motion without dropping or grasping the pipe is apparent as a substantial problem. Loading a pipe from the rack 18, for example, onto a helical-movement transport as the transport 14 may also be seen to present a similar problem. In general, in accordance with the present system, the pipe 10 is lifted from its moving position between the wheel pairs 12 of the transport 9 by a plurality of wheels 18 (FIGURE 2) which move from a position below and to the right of the path of the pipe 10 to a position above and to the left of the path of the pipe 10 (FIGURE 3). As a result, the pipe is engaged and lifted from the transport 9 onto the roll rack 12. The transfer occurs smoothly without scarring or damaging the pipe as a result of the co-action of the wheels 18 with the inside wheels of the pairs 16.

The rack 12 includes rails 20 which have a slight incline, causing pipes 10 to roll downwardly onto fingers 22 (FIGURE 1). In general, the fingers 22 (FIGURE 5) pivot about an axis 24 to gently lower the pipes 10 onto the wheel pairs 16 of the rack 12. Of course, these loading and unloading structures may be variously utilized for cooperative transfers to and from various structures cooperating with a helical motion transport.

The helical transport may take a wide variety of different forms, wherein a plurality of wheel pairs cooperatively drive a pipe to a helical pattern of motion. In the specific embodiment hereof, the individual pairs of wheels are generally similar, only one of which will be described in detail.

As shown (upper left, FIGURE 1), each pair 16 of wheels includes two spaced-apart individual wheels 26 and 28 which are rotatively supported on axles 30 and 32 respectively. These axles are held substantially horizontal and parallel by spaced-vertical flange plates 34 (FIGURE 2) extending upwardly from circular horizontal adjustment tables 36 mounted on support stands 38. The adjustment tables 36 are ganged together through a connecting rod 40 (FIGURE 1) interconnecting extension tabs 42 (FIGURE 2) affixed to each of the tables 36. By means of the interconnecting rod 40, the wheel pairs 16 are simultaneously adjusted by setting any one of the pairs in a desired position.

The individual wheels 26 and 28 (FIGURE 2) are fixed on the plates 34 by journals 44 carrying a wheel axle 46. The wheels each include a rubber tire 48 carried on a wheel rim 50. The treads of the tires 48 engage and carry the pipes to provide cushioned frictional engagement as shown.

As indicated, the individual pairs 16 of wheels are generally similar; however, certain of the wheels are driven by motors 52 (FIGURE 1) while others run as idlers. Specifically for example, the wheel pair 16A (upper right) includes individual wheels that are interconnected by a coupling 54. Furthermore, one of the wheels is connected to a motor 52 through a drive coupling 56. As a result, the wheels of a driven pair 16A are moved and synchronized to accomplish a controlled motion of the pipe along the transport 9.

In view of the above preliminary description of the helical-motion transports 9 and 14 along with that of the rack 12, a complete and detailed understanding of the entire system may now best be provided by assuming certain initial conditions and explaining the sequence of operation therefrom, somewhat concurrently with the introduction of other operating elements. Therefore, assume initially that the pipe 10 is moving on the transport 9 (FIGURE 1) from left to right, substantially as shown, and that the pipe is to be lifted from the transport 9, rolled downwardly on the rack 12, then positioned on the transport 14 to be moved from right to left. This sequence of the operation is therefore to be performed in accordance with the structure hereof without scratching or marring the surface of the pipe as a result of gentle transitions between the various structures.

In general, the movement of the pipe 10 from the transport 9 to the rack 12 is accomplished by the three aligned wheels 18 moving pivotally to lift pipe 10 so that it rides over the inboard row of wheels 28, to then roll onto the rack 12. Specifically, the offloading wheels 18 (FIGURE 2) are parallel the wheels 16 and in their quiescent position lie below and to the right of the pipe 10 as shown. These wheels are similar to the other wheels as previously described including a balloon or pneumatic tire affixed to the rim and are carried on a shaft 58 fixed into journals 60 for free rotation. The bearing journals 60 are in turn affixed to a support yoke 62 which is carried on an arm 64 that is cantilevered from a rotatably-mounted rod or drive shaft 66. The pivotal motion of the arms 64 carrying the wheels 18 results from a partial revolution of the drive shaft 66, which is accomplished by a pneumatic actuator 68 (FIGURE 4) acting through a bell crank 70 (also shown in phantom) that is pivotally connected to a plunger 72 of the actuator 68 and to the shaft 66. The actuator 68 is supported in a pivot yoke 74 whereby driving forces are somewhat balanced, and is connected to a source of pneumatic pressure through a duct 76. As a result, upon the application of pressure through the duct 76 to the actuator 68, the actuator acts through the bell crank 70 turning the shaft 66 through nearly one-quarter revolution moving the wheels 18 from the position shown in FIGURE 2 to the position shown in FIGURE 3, thereby offloading the pipe 10 from the transport 9 onto the rack 12. Thus, the wheels 18 move in an arcuate pattern through the linear path of the pipe 10 so as to lift the pipe in cushioned engagement with the wheels 28 until the revolving pipe rolls onto a cushioned receiver pad 78 (FIGURE 3) on the rack 12. It is to be noted, that the wheels 18 and 28 matingly engage and carry the pipe in a co-acting relationship until the pipe rolls from the wheels 28 onto the cushion pad 78.

Upon landing on the cushion pads 78 (FIGURE 1) the pipe 10 falls onto the rails 20 and then in turn into fingers 22 (FIGURE 5) lying between certain of the wheel pairs 16 of the conveyor 14. The fingers 22 (FIGURE 5) are somewhat arcuate in shape, including a first segment 80 that is normally aligned with the rails 20, and an angularly joined second segment 82 normally extending somewhat vertically. The segments 80 and 82 are joined at an apex 84 into which the pipe 10 normally comes to a stop. The fingers 22 may be formed of various structures; however, in one satisfactory form a flat flange 86 (FIGURE 7) is integrally affixed to a pair of perpendicular flat members 87 to provide a sturdy and durable structure.

The fingers 22 are supported in a frame 88 including columns 90 (FIGURE 5) which are supported in an upright position by diagonals 92 and side braces 94 (FIGURE 7). Movement of the fingers 22 is by a shaft 99 which is driven by an actuator 100 (FIGURE 1) that is generally similar to the actuator 68 as previously described. The shaft 99 is supported, as the shaft 66, in a bearing structure 101 for movement through a partial revolution.

The shaft 99 is pivotally connected to the fingers 22 through a plurality of bell cranks 102 and linkages 104. Specifically, the bell cranks 102 are integrally affixed to the shaft 99 and extend to receive a pin 106 also extending through the linkage 104 comprising two separate extensions. At the upper end of the linkage 104 (FIGURE 7)

a pin 110 is commonly received with the support members 87 to pivotally join the linkage 104 to the fingers 22.

In the detailed operation of the loading structure, a pipe 10 rolls from the position indicated in phantom in FIGURE 5 to the position shown by solid lines. Thereupon, the shaft 99 is driven through a partial revolution by the actuator 100 swinging the bell crank 102 in a counterclockwise direction from the position as shown in FIGURE 5 to the position as shown in FIGURE 6. As a result, the pipe 10 is lowered onto the wheels 26 and 28 neatly positioned between the two wheels for helical movement as described above. The pipe 10 then moves along the path defined by the wheel pairs 16 to be cleared from the fingers 22 (FIGURE 1). Thereafter, the actuator 100 is released permitting the fingers 22 to raise to their residual position as shown in FIGURE 5.

It may therefore be seen, that the illustrative system hereof is operative to convey pipes to and from spiral transports without the application of shock forces or other encounters which would tend to scratch or mar a finish applied to the pipe. Thus, helical transports may be employed in treating installations with a significant improvement in economy.

Advantages of the invention

The system hereof enables the precise and gentle handling of pipes in transition onto and off of a spiral or helical transport apparatus. In this regard, the removal structures function to carefully control the motion of the pipe retaining it against shock motion or other encounters which might damage the pipe finish.

The system hereof also affords a rapid and relatively simple removal system for pipes from a helical transport, which system is simple and effective without significant danger of jamming or other malfunction. The result is increased economy and reduction of manual operation.

The structure hereof as illustratively disclosed may also be manufactured relatively easily and operated substantially free of maintenance over extended intervals of time. Of course, other and incidental advantages of the present invention will become apparent to those skilled in the art to which the invention relates. It is stressed that the structure as described is merely illustrative and a wide variety of different pipe-movement patterns will be readily apparent to those skilled in the art, employing various aspects hereof.

What is claimed is:

1. A conveyor for pipes, as for use in processing or treating said pipes, comprising:
    a plurality of pairs of rotatively-mounted cooperating transport wheels, said transport wheels in each pair being mounted to support a pipe therebetween;
    means supporting said pairs of transport wheels in spaced-apart relationship along a linear path for said pipes the axis of each of said transport wheels in a pair being parallel to each other and angularly offset in canted relationship to said linear path, whereby revolution of said transport wheels displaces a pipe along said linear path;
    motive means for rotatively driving certain of said transport wheels;
    a loading rack for said pipes; and
    control-activated pivotal means for transferring a pipe between said pairs of revolving transport wheels and said loading rack;
    a plurality of off-loading wheels axially aligned with said transport wheels, angularly offset from said linear path in canted relationship thereto;
    pivotal mounting means for individually supporting said wheels in spaced apart relationship along said linear path, said mounting means supporting said wheels for radial movement transverse to said linear paths; and
    actuator means for moving said off-loading wheels on associated respective pivotal mounting means, in concert from a quiescent postiion below and at one side of said axial path to above and the other side of said path whereby to remove a pipe from said transport wheels by rotative engagement therewith, to said rack.

2. A conveyor apparatus according to claim 1 wherein said transport wheels and said off-loading wheels include pneumatic tires for engaging said pipes.

3. A conveyor apparatus according to claim 1 wherein said actuator means includes: shaft means supporting said off-loading wheels; a plurality of arms affixed to be driven in an arc by said shaft means, said arms carrying said off-loading wheels; and means for turning said shaft means through a partial revolution.

References Cited

UNITED STATES PATENTS

| | | | |
|---|---|---|---|
| 1,549,499 | 8/1925 | Parker | 193—35 |
| 2,525,305 | 10/1950 | Lombard. | |
| 2,710,104 | 6/1955 | Putnam | 214—1 X |
| 3,322,291 | 5/1967 | Smith | 214—1 X |

GERALD M. FORLENZA, Primary Examiner.

FRANK E. WERNER, Assistant Examiner.

U.S. Cl. X.R.

254—2; 269—17; 214—339